(12) United States Patent
Beattie, Jr. et al.

(10) Patent No.: US 11,102,555 B2
(45) Date of Patent: Aug. 24, 2021

(54) SYSTEM AND METHOD FOR LAYERED DELIVERY OF MEDIA CONTENT QUALITY

(71) Applicant: AT&T Intellectual Property I, L.P., Atlanta, GA (US)

(72) Inventors: James Gordon Beattie, Jr., Bergenfield, NJ (US); Stephen J. Griesmer, Westfield, NJ (US); Arvind Ramdas Mallya, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 174 days.

(21) Appl. No.: 16/240,228

(22) Filed: Jan. 4, 2019

(65) Prior Publication Data
US 2019/0141409 A1    May 9, 2019

Related U.S. Application Data

(60) Continuation of application No. 15/477,484, filed on Apr. 3, 2017, now Pat. No. 10,212,487, which is a
(Continued)

(51) Int. Cl.
*H04N 21/6587* (2011.01)
*H04N 21/845* (2011.01)
(Continued)

(52) U.S. Cl.
CPC ... *H04N 21/6587* (2013.01); *H04N 21/23439* (2013.01); *H04N 21/4424* (2013.01);
(Continued)

(58) Field of Classification Search
CPC ......... H04N 21/47202; H04N 7/17318; H04N 7/17336; H04N 21/6587; H04N 21/6125;
(Continued)

(56) References Cited

U.S. PATENT DOCUMENTS 8,010,984 B2    8/2011 Thukral
8,036,690 B1   10/2011 Delker
(Continued)

FOREIGN PATENT DOCUMENTS

WO    2009078546 A1    6/2009

OTHER PUBLICATIONS

"Radio Bookmark—The small, portable device that makes it simple to follow up on the public radio stories you don't want to forget, viewed Nov. 20, 2009", web home page http://www.radiobookmark.com.

*Primary Examiner* — Ngoc K Vu
(74) *Attorney, Agent, or Firm* — Guntin & Gust, PLC; Mark Wilinski

(57) ABSTRACT

A method in a server for providing various Internet Protocol television signal qualities involves an IPTV signal having a first signal quality that is transmitted over a first network connection to a first device. A request to receive the IPTV signal over a second network connection at a second device with the IPTV signal having a second signal quality is received. A determination is made that the second network connection has sufficient bandwidth to transmit the IPTV signal at the second signal quality, and that the second device is capable of receiving IPTV signal. The transmission of the IPTV signal over the first network connection to the first device is ended. An endpoint for the transmission of the IPTV signal to the first device is determined. The IPTV signal is transmitted over the second network connection to the second device at the second signal quality beginning at the determined endpoint.

20 Claims, 7 Drawing Sheets

Related U.S. Application Data continuation of application No. 14/620,373, filed on Feb. 12, 2015, now Pat. No. 9,648,393, which is a division of application No. 12/624,109, filed on Nov. 23, 2009, now Pat. No. 9,131,278.

(51) Int. Cl.

| | | |
|---|---|---|
| *H04N 21/2343* | (2011.01) | |
| *H04N 21/63* | (2011.01) | |
| *H04N 21/442* | (2011.01) | |
| *H04N 21/462* | (2011.01) | |
| *H04N 21/61* | (2011.01) | |
| *H04N 21/647* | (2011.01) | |
| *H04N 21/658* | (2011.01) | |

(52) U.S. Cl.
CPC ..... *H04N 21/4622* (2013.01); *H04N 21/6125* (2013.01); *H04N 21/631* (2013.01); *H04N 21/647* (2013.01); *H04N 21/6582* (2013.01); *H04N 21/8455* (2013.01)

(58) Field of Classification Search
CPC ............... H04N 21/25841; H04N 7/22; H04N 21/23439; H04N 21/235; H04N 21/41407; H04N 21/6131; H04N 21/4424; H04N 21/4622; H04N 21/631; H04N 21/647; H04N 21/6582; H04N 21/8455

See application file for complete search history.

(56) References Cited

U.S. PATENT DOCUMENTS

| | | | |
|---|---|---|---|
| 8,677,430 B2* | 3/2014 | Mitsuji | ................ H04N 7/1675 |
| | | | 725/93 |
| 9,648,393 B2 | 5/2017 | Beattie, Jr. et al. | |
| 10,212,487 B2* | 2/2019 | Beattie, Jr. | ......... H04N 21/6125 |
| 2007/0094691 A1* | 4/2007 | Gazdzinski | ........ H04N 21/4126 |
| | | | 725/62 |
| 2007/0204313 A1 | 8/2007 | McEnroe et al. | |
| 2008/0126919 A1 | 5/2008 | Uskali et al. | |
| 2008/0127255 A1 | 5/2008 | Ress | |
| 2008/0127281 A1 | 5/2008 | Van Flandern | |
| 2008/0285936 A1 | 11/2008 | Yampanis et al. | |
| 2009/0044229 A1* | 2/2009 | Taylor | ................ H04L 67/1095 |
| | | | 725/62 |
| 2009/0100477 A1 | 4/2009 | Jeffs | |
| 2009/0222874 A1 | 9/2009 | White | |
| 2010/0333137 A1 | 12/2010 | Hamano et al. | |
| 2017/0208368 A1 | 7/2017 | Beattie, Jr. | |

* cited by examiner

SYSTEM AND METHOD FOR LAYERED DELIVERY OF MEDIA CONTENT QUALITY

CROSS-REFERENCE TO RELATED APPLICATIONS

This application is a continuation of U.S. patent application Ser. No. 15/477,484, filed Apr. 3, 2017, which is a continuation of U.S. patent application Ser. No. 14/620,373, filed Feb. 12, 2015 (now U.S. Pat. No. 9,648,393), which is a divisional of U.S. patent application Ser. No. 12/624,109, filed Nov. 23, 2009 (now U.S. Pat. No. 9,131,278). All sections of the aforementioned application(s) and patent(s) are incorporated herein by reference in their entirety.

FIELD OF THE DISCLOSURE

The present disclosure generally relates to communications networks, and more particularly relates to a system and a method for layered delivery of media content quality.

BACKGROUND

An Internet Protocol television (IPTV) service provider can transmit an IPTV signal to a user via a central office, a serving area interface, and a residential gateway. The IPTV service provider can offer the user a variety of different television programs and/or movies. For example, the IPTV service provider can supply users with real-time television programs that are typically available for the users to watch only at a specific date and time. The IPTV service provider can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
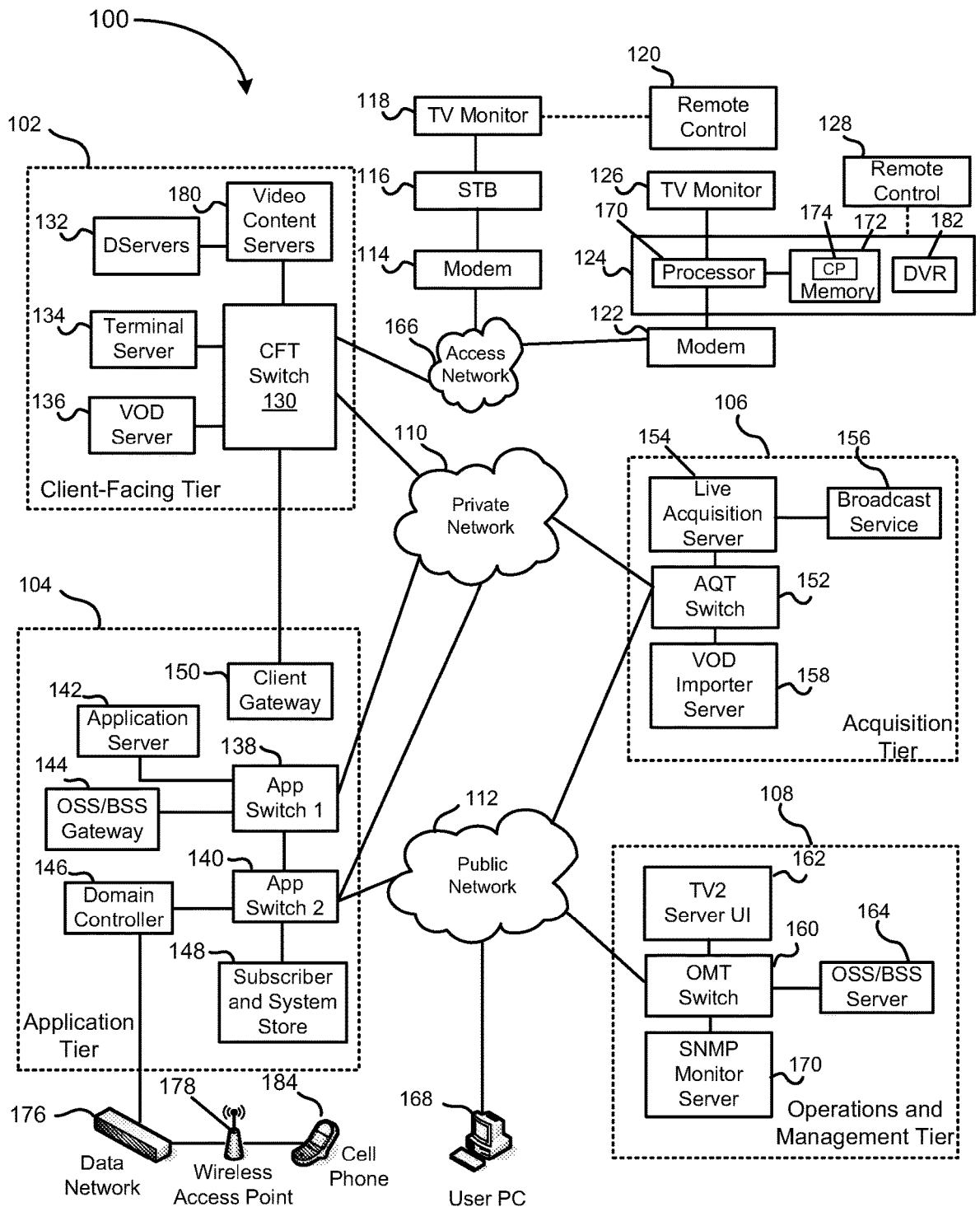
FIG. 1 is a block diagram of an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data. The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
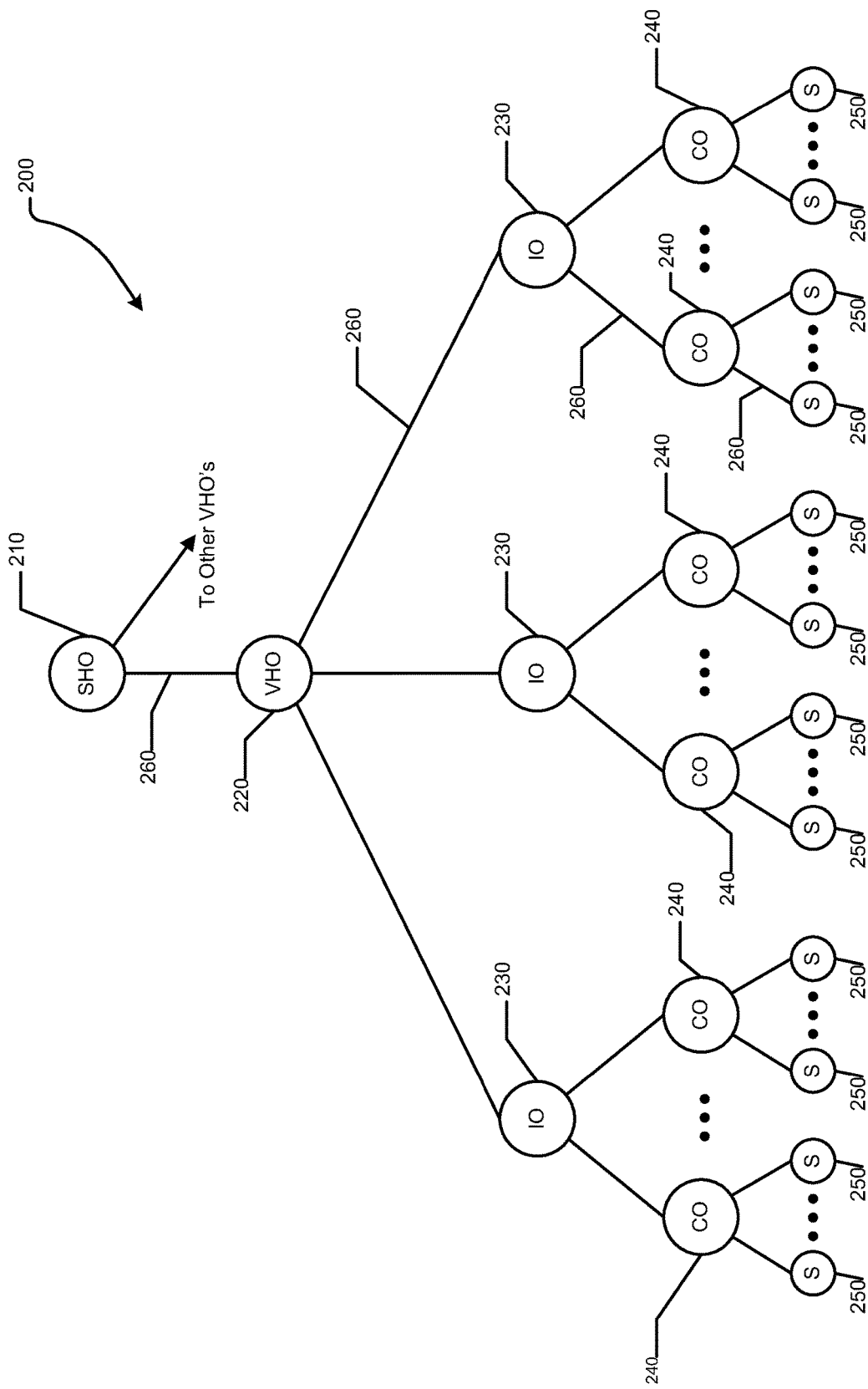
FIGS. 2 and 3 are block diagrams of an embodiment of an IPTV network.

FIG. 2 shows one example embodiment of a television distribution system or network 200, using IPTV technology in this example but not limited thereto, adapted to provide, among other things, the live television content features of the disclosed subject matter. The network 200 may include a super hub office (SHO) 210 for acquisition and encoding of video content, one or more video hub offices (VHO) 220 in each demographic market area (DMA), one or more intermediate offices (IO) 230, one or more central offices (CO) 240 located in each metropolitan area, and subscribers 250, who may be located in single or multiple dwelling units. In one example embodiment, the network 200 may be connected through a plurality of high speed communication links 260 using physical transport layers such as fiber, cable, twisted pair, air, or other media.

In one example embodiment of the IPTV video delivery system, the SHO 210 distributes content to one or more VHOs 220 which may be spread across a wide geographic territory, such as an entire country. The SHO 210 may, for example, be in a central location for acquisition and aggregation of national-level broadcast television (or linear) programming. A redundant SHO 210 may be provided for backup in case of failure. The SHO 210 may also provide the central point of live television content acquisition and insertion into the IPTV network. Linear programming may be received at the SHO 210 via satellite and processed for delivery to the VHO 220. Live television content may be received from various sources and processed/encoded to codec and bit-rate requirements for the communication network for transmission to the VHO 220 over the high speed communication links. The VHOs 220 are the video distribution points within each DMA or geographic region.

Figure 3:
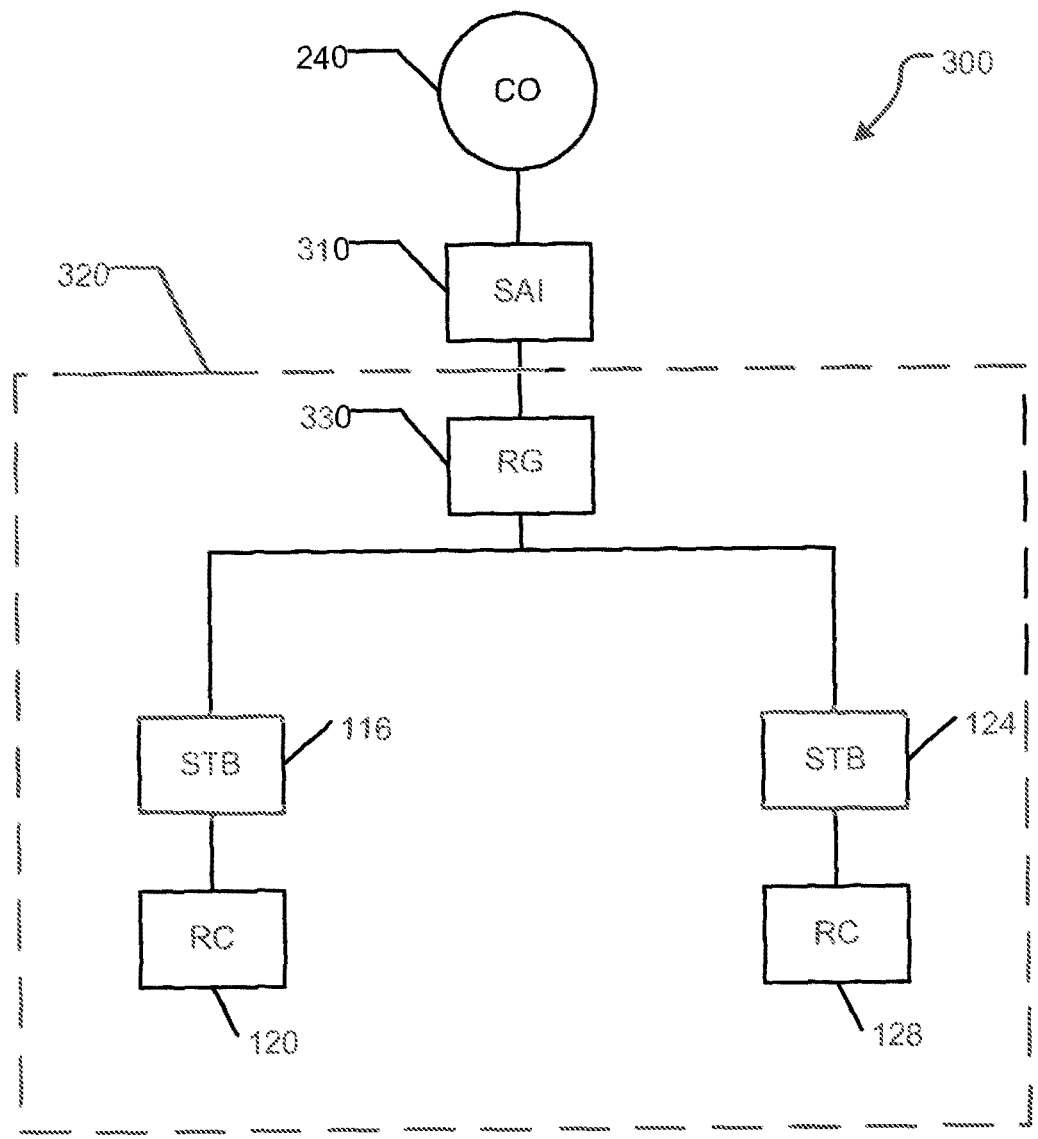

FIG. 3 shows an exemplary network architecture 300 between the CO 240 and customer premises equipment (CPE) 320 of the subscriber 250 shown in FIG. 2. A serving area interface (SAI) or video ready access device (VRAD) 310 may be connected to the CO 240. SAI 310 may, for example, be located in a weather-proof enclosure proximate the subscriber 250 premises, and may include fiber-to-the-node (FTTN) equipment, such as a digital subscriber line access multiplexer (DSLAM). FTTN equipment may also be located in the CO 240. The customer premises equipment (CPE) 320 includes, for example, a network interface device (not shown) and a residential gateway (RG) 330, with a built-in very-high-bit-rate digital subscriber loop (VDSL) modem or optical network termination (ONT). In either case the RG 330 may be connected to the rest of the home set-top box devices 116 and 124 via an internal network such as an Ethernet. The set-top box devices 116 and 124 each have an associated remote control device 120 and 128 which provides data entry to the set-top box devices to control the IPTV selections from the IPTV data streams.

Figure 4:
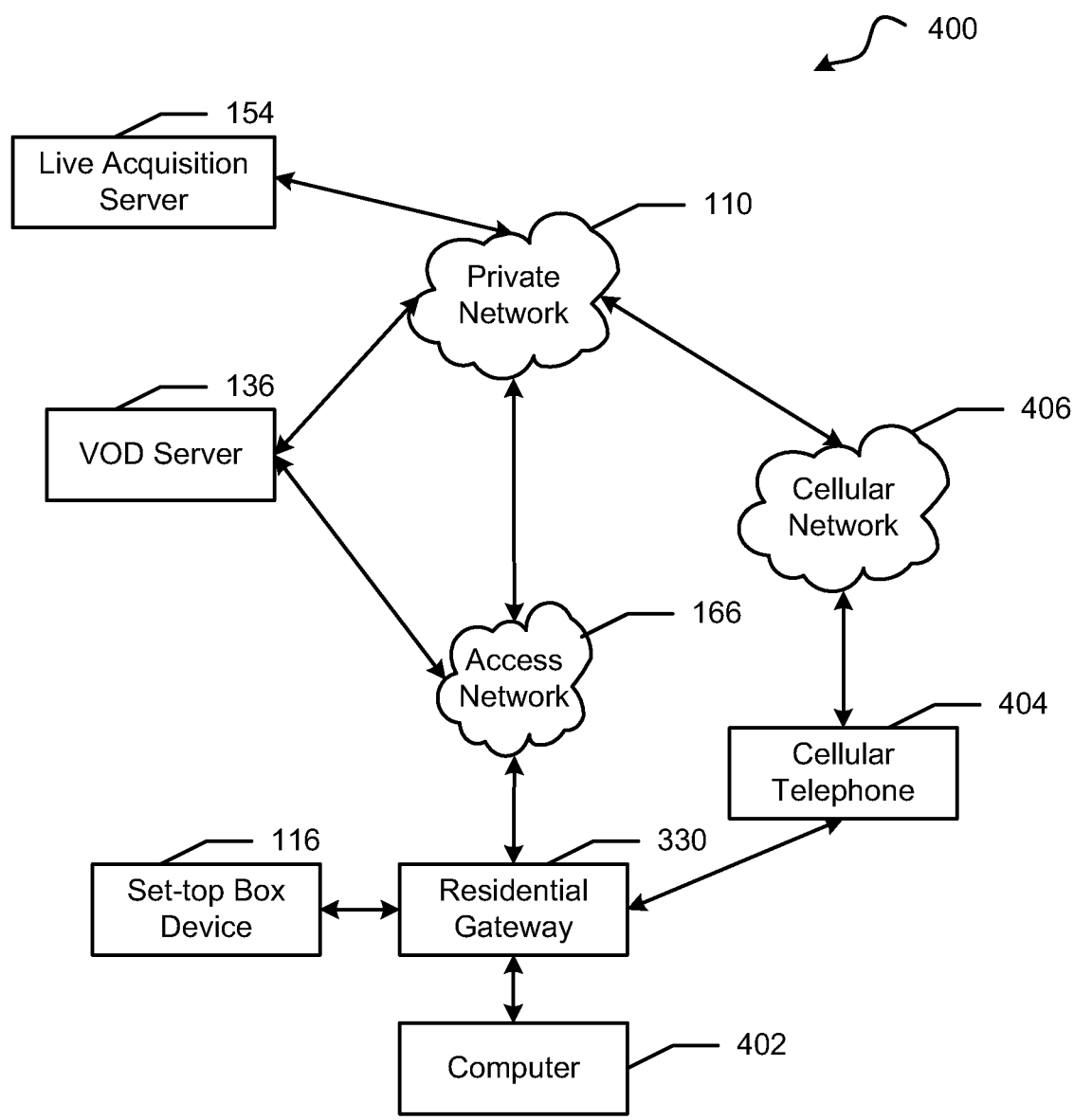
FIG. 4 is a block diagram of a portion of the ITPV system.

FIG. 4 shows a portion 400 of the IPTV system including a computer 402, a cellular telephone 404, a cellular network 406, the private network 110, the set-top box device 116, the VOD server 136, the live acquisition server 154, the access network, and the residential gateway 330. The residential gateway 330 is in communication with the VOD server 136 via the access network 166, and is in communication with the live acquisition server 154 via the access network and the private network 110. The residential gateway 330 is also in communication with the set-top box device 116, the computer 402, and the cellular telephone 404. Thus, the set-top box device 116, the computer 402, and the cellular telephone 404 can communicate with the VOD server 136 and the live acquisition server 154 via the residential gateway 330, the access network 166, and the private network 110. Additionally, the cellular telephone 404 can communicate with the VOD server 136 and the live acquisition server 154 via the cellular network 406 and the private network 110.

The set-top box device 116, the computer 402, and the cellular telephone 404 can receive IPTV video streams from the VOD server 136 and/or the live acquisition server 154. Depending on the device and network connection used to receive the video signals, different quality levels of the video stream may be available to a user. For example, if the user utilizes the cellular telephone 404 and the cellular network 406 to receive video streams from the VOD server 136 and/or from the live acquisition server 154, the video stream quality may not be as good as compared to utilizing the set-top box device 116, the residential gateway 330, the access network 166, and the private network 110. The video stream quality can depend on the bandwidth available in the network to deliver the video streams to the specified device.

For example, the cellular network 406 can have less bandwidth available to the user to receive a video stream than the access network 166, such that the video stream needs to be lower bandwidth when the video stream is to be displayed in real-time by the cellular telephone 404 via the cellular network rather than displayed by the set-top box device 116 via the access network.

Additionally, the user can request a basic grade of initial service quality, or a grade of service consistent with the user's real-time presentation device requirement, while allowing for High-Definition (HD) content to be furnished to the user at a later time. For example, the user may request a basic grade of initial service quality while viewing a video stream on the cellular telephone 404 via the cellular network 406. However, as the user is viewing the video stream on the cellular telephone 404, the VOD server 136 and/or the live acquisition server 154 can transmit an HD video stream of the same content to the set-top box device 116 or to the computer 402 for later use by the user. Therefore, the user can have access to the high quality video stream when the user accesses the stored HD video stream on the set-top box device 116 or on the computer 402.

The user can utilize the set-top box device 116 to receive high quality video streams from the VOD server 136 and/or from the live acquisition server 154, and the user can request that one of the video streams be received by the cellular telephone. For example, the user can receive a video stream on the set-top box device 116, but have to leave the premises. Thus, the user may want to start receiving the video stream on the cellular telephone 404. The video stream may be associated with a live event, may be a VOD video stream, may be a pay-per-view video stream, and the like. In this situation, the user can select to stop receiving and/or displaying the video stream on the set-top box device 116. The user can then select to have the video stream transmitted to the cellular telephone 404. The transmission of the video stream can either be started at the point in the video stream that was stopped at the set-top box device 116 or at the current location of the video stream. For example, if the user is watching a live sporting event via the set-top box device 116, the user can either continue receiving the video stream for the sporting event on the cellular telephone 404 at the location where viewing the set-top box device was stopped, or can receive the video stream at a current live point in the video stream and simply skip the intervening portion of the sporting event.

If the user wants to receive the video stream at the point last received by the set-top box device 116, the IPTV network can use program checkpoints or elapsed time ticks to track the location that the set-top box device 116 stopped receiving the video stream. The program checkpoints and the elapsed time ticks can allow for the user to continue viewing the content of the video stream on different devices, such as the set-top box device 116, the computer 402, and the cellular telephone 404, in vehicle devices, and the like. The set-top box device 116 can place a program checkpoint within the video stream and transmit the video stream back to the VOD server 136 or the live acquisition server 154, which in turn can use the program checkpoint as a starting point for transmitting the video stream to another device. Alternatively, the VOD server 136 or the live acquisition server 154 can monitor the elapsed time ticks in the video stream to determine the amount of the video stream already transmitted to the set-top box device 116, and the VOD server or the live acquisition server can start transmitting the video stream to the other device beginning with the last elapsed time tick in the video stream.

In an embodiment, the set-top box device 116, the computer 402, and the cellular telephone 404 are preferably all associated with the same user account, such that the VOD server 136 or the live acquisition server 154 can determine that the user is permitted to switch between the different devices receiving the video stream. Alternatively, the user may have a login name and password to enter via each device to access the video stream.

The user may also receive a video stream from the VOD server 136 or from the live acquisition server 154 without the signal quality of the video stream maximizing an available bandwidth of the IPTV network, the VOD server, and/or the live acquisition server but still have a quality presentation delivered to the user. The user may also want to access the media content of the video stream in an HD format at a later time. Thus, the media content can be provided in a 'layered' format where the user obtains the minimal format in real-time and when additional bandwidth is available, the additional signal quality can be downloaded to the set-top box device 116. The set-top box device 116 can then synchronize the media layer elements to create a video stream at a maximum signal quality level that can be available to the user at a later time. The additional signal quality can be for the audio portion, video portion, or integrated audio and video portions.

Figure 5:
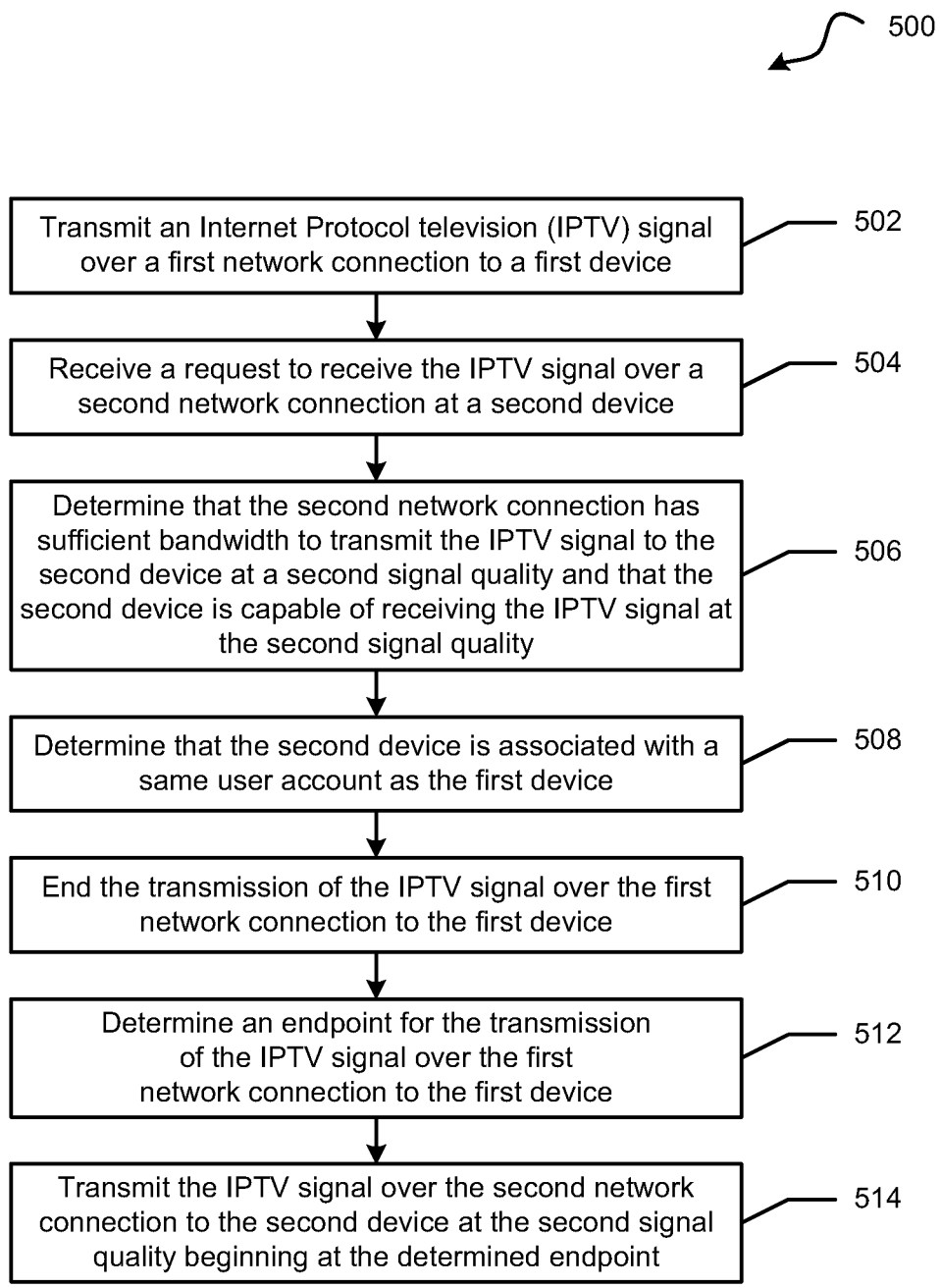
FIG. 5 is a flow diagram of a method for providing an IPTV signal to multiple devices at different signal qualities based on a respective network connection.

FIG. 5 shows a flow diagram of a method 500 for providing an IPTV signal to multiple devices at different signal qualities based on a respective network connection. At block 502, an IPTV signal is transmitted over a first network connection to a first device, such as a set-top box device. The IPTV signal can be transmitted over the first network connection with a first signal quality. A request to receive the IPTV signal over a second network connection at a second device is received at block 504. The second device can be a cellular telephone, and the second network connection can be a cellular network. The IPTV signal can be received over the second network connection with a second signal quality. At block 506, the second network connection is determined to have sufficient bandwidth to transmit the IPTV signal to the second device at a second signal quality, and the second device is determined to be capable of receiving the IPTV signal at the second signal quality.

At block 508, the second device is determined to be associated with a same user account as the first device. The transmission of the IPTV signal over the first network connection to the first device is ended at block 510. At block 512, an endpoint for the transmission of the IPTV signal over the first network connection to the first device is determined. The IPTV signal is transmitted over the second network connection to the second device at the second signal quality beginning at the determined endpoint at block 514.

Figure 6:
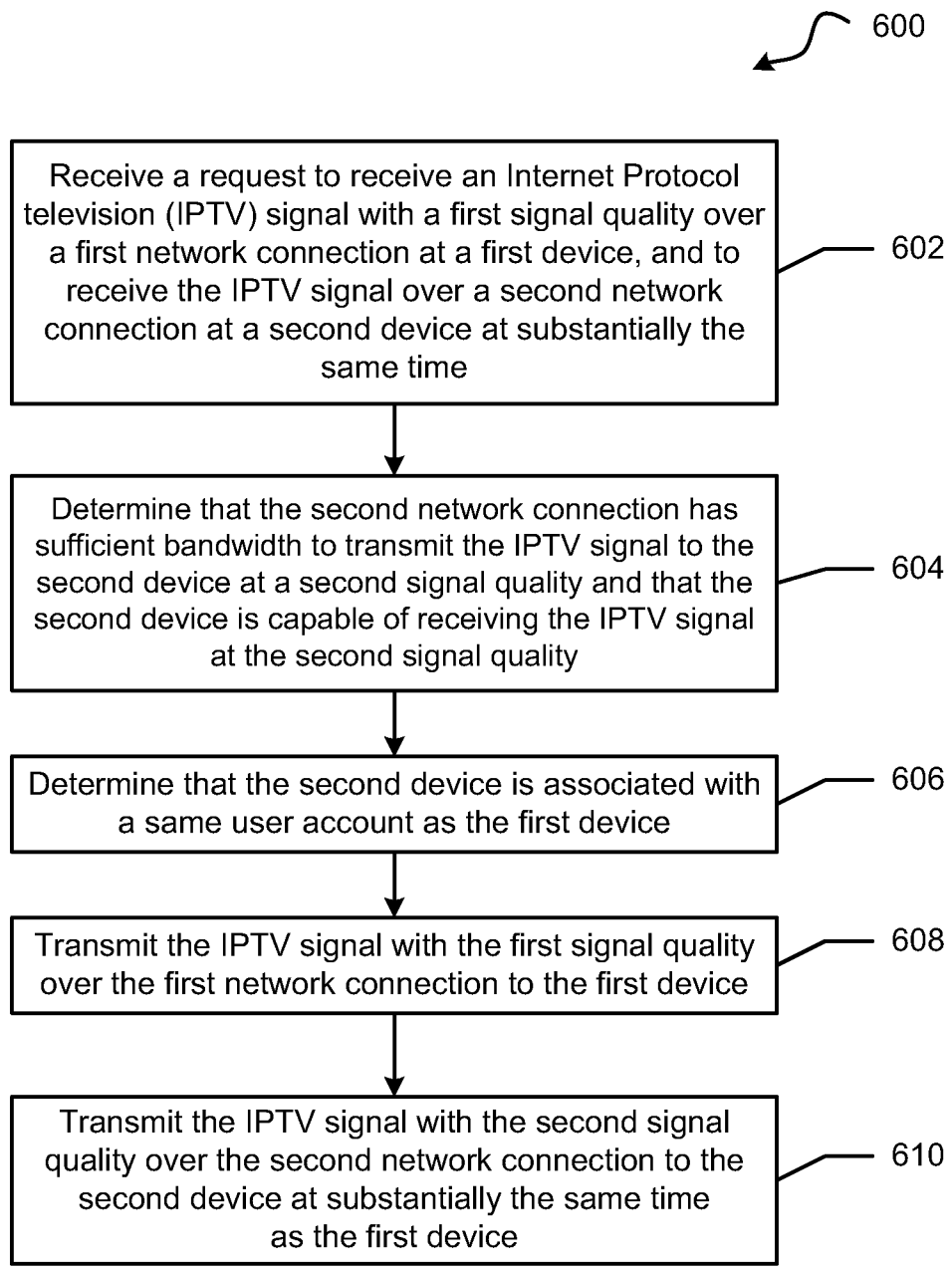
FIG. 6 is a flow diagram of an alternative method for providing the IPTV signal to multiple devices at different signal qualities based on a respective network connection.

FIG. 6 shows a flow diagram of an alternative method 600 for providing the IPTV signal to multiple devices at different signal qualities based on a respective network connection. At block 602, a request to receive an ITPV signal with a first signal quality over a first network connection at a first device, and to receive the IPTV signal over a second network connection at a second device at substantially the same time is received. The first device can be a cellular telephone, and the first network connection can be a cellular network. The second device can be a set-top box device, and the second network connection can be an IPTV network.

The second network connection is determined to have sufficient bandwidth to transmit the IPTV signal to the second device at the second signal quality, and the second device is determined to be capable of receiving the IPTV signal at the second signal quality at block 604. At block 606, the second device is determined to be associated with the same user account as the first device. The ITPV signal is transmitted with the first signal quality over the first network connection to the first device at block 608. At block 610, the IPTV is transmitted with the second signal quality over the second network connection to the second device at substantially the same time.

Figure 7:
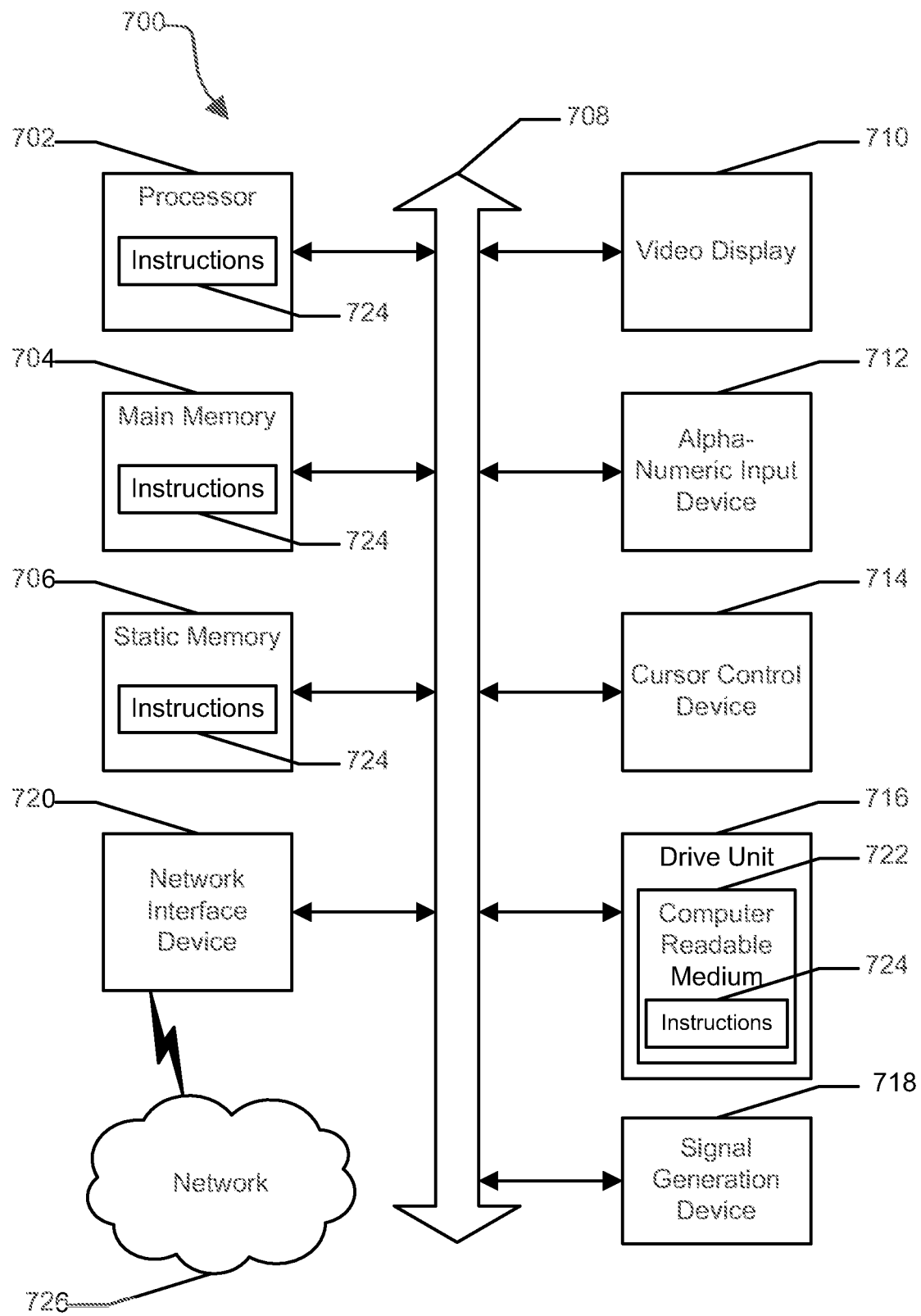
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid state display, or a cathode ray tube (CRT). Additionally, the computer system 700 may include an input device 712 such as a keyboard, and a cursor control device 714 such as a mouse. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   receiving, by a system including a processor, a request to receive a content signal with a first signal quality over a first network connection at a first device, and to receive the content signal with a second signal quality over a second network connection at a second device at substantially a same time, wherein the first signal quality is less than a third signal quality, the third signal quality corresponding to a maximum available bandwidth of a first network associated with the first network connection;
   determining, by the system, that the first network connection has a sufficient bandwidth to transmit the content signal to the first device at the first signal quality and that the first device is capable of receiving the content signal at the first signal quality;
   determining, by the system, that the first device is associated with a same user account as the second device;
   responsive to the determining that the first network connection has the sufficient bandwidth to transmit the content signal to the first device at the first signal quality and that the first device is capable of receiving the content signal at the first signal quality, and responsive to the determining that the first device is associated with the same user account as the second device:
   transmitting, by the system, the content signal with the first signal quality over the first network connection to the first device; and transmitting, by the system, the content signal with the second signal quality to the second device at substantially the same time as the transmitting the content signal to the first device; and based on additional bandwidth in the first network becoming available subsequent to the transmitting of the content signal with the first signal quality over the first network connection to the first device, transmitting, by the system, an additional signal over the first network connection to the first device that causes the first device to synchronize media layer elements of the content signal and the additional signal to create a video stream at the third signal quality that is available for access at a later time.

2. The method of claim 1, wherein the second network connection is a cellular network connection.

3. The method of claim 1, wherein the second device is a cellular telephone.

4. The method of claim 1, wherein the first device is a set-top box device.

5. The method of claim 1, wherein the first signal quality is greater than the second signal quality.

6. The method of claim 5, wherein the first signal quality is in a high-definition format.

7. The method of claim 1, wherein the content signal comprises a television signal that is transmitted over an internet protocol television network.

8. The method of claim 1, further comprising storing on the first device the content signal that was transmitted to the first device.

9. The method of claim 1, wherein the system comprises a server.

10. The method of claim 9, wherein the server comprises a video-on-demand server.

11. The method of claim 1, wherein the content signal is associated with a live event.

12. A server comprising:
a processing system including a processor; and
a memory storing executable instructions that, when executed by the processing system, perform operations comprising:
receiving a request to send a content signal with a first signal quality over a first network connection to a first device and to send the content signal with a second signal quality to a second device at substantially a same time, wherein the first signal quality is less than a third signal quality, the third signal quality corresponding to a maximum available bandwidth of a first network associated with the first network connection;
determining that the first network connection has a sufficient bandwidth to communicate the content signal to the first device at the first signal quality and that the first device is capable of receiving the content signal at the first signal quality;
determining that the first device and the second device are associated with a same user account based on a login name and password that are entered at each of the first device and the second device;
responsive to the determining that the first network connection has the sufficient bandwidth to communicate the content signal to the first device at the first signal quality and that the first device is capable of receiving the content signal at the first signal quality, and responsive to determining that the first device and the second device are associated with the same user account:

sending the content signal with the first signal quality over the first network connection to the first device; and
sending the content signal with the second signal quality to the second device at substantially the same time as the sending the content signal to the first device; and
based on additional bandwidth in the first network becoming available subsequent to the sending of the content signal with the first signal quality over the first network connection to the first device, sending to the first device over the first network connection an additional signal that causes the first device to synchronize media layer elements of the content signal and the additional signal to create a video stream at the third signal quality that is available for access at a later time.

13. The server of claim 12, wherein the content signal comprises a television signal that is sent over an internet protocol television network.

14. The server of claim 12, wherein the operations further comprise enabling storage on the first device of the content signal that was sent to the first device.

15. The server of claim 12, wherein:
the first device is a set-top box device;
the second device is a cellular telephone;
the sending of the content signal with the second signal quality is over a cellular network connection;
the first signal quality is greater than the second signal quality; and
the first signal quality is in a high-definition format.

16. The server of claim 12, wherein the server comprises a video-on-demand server.

17. A non-transitory computer-readable storage medium, comprising executable instructions that, when executed by a processing system including a processor, perform operations comprising:
receiving a request to send, at substantially a same time:
a content signal with a first signal quality over a first network connection to a first device; and
the content signal with a second signal quality to a second device, wherein the first signal quality is less than a third signal quality, the third signal quality corresponding to a maximum available bandwidth of a first network associated with the first network connection;
determining that the first network connection has a sufficient bandwidth to provide the content signal to the first device at the first signal quality and that the first device is capable of receiving the content signal at the first signal quality;
determining that a same user account is associated with the first device and the second device based on a login name and password that are entered at each of the first device and the second device;
responsive to the determining that the first network connection has the sufficient bandwidth to provide the content signal to the first device at the first signal quality and that the first device is capable of receiving the content signal at the first signal quality, and responsive to determining that the same user account is associated with the first device and the second device:
sending to the first device over the first network connection the content signal with the first signal quality; and
sending to the second device the content signal with the second signal quality, wherein the content signal is sent to the second device at substantially the same time as the content signal is sent to the first device; and based on additional bandwidth in the first network becoming available subsequent to the sending to the first device over the first network connection the content signal with the first signal quality, sending to the first device over the first network connection an additional signal that causes the first device to synchronize media layer elements of the content signal and the additional signal to create a video stream at the third signal quality that is available for access at a later time.

18. The non-transitory computer-readable storage medium of claim 17, wherein:
   the first device is a set-top box device;
   the second device is a cellular telephone; and
   the sending to the second device of the content signal with the second signal quality is over a cellular network connection.

19. The non-transitory computer-readable storage medium of claim 17, wherein:
   the first signal quality is greater than the second signal quality.

20. The non-transitory computer-readable storage medium of claim 19, wherein the first signal quality is in a high-definition format.

\* \* \* \* \*